(12) United States Patent
Jayne et al.

(10) Patent No.: US 11,769,180 B2
(45) Date of Patent: *Sep. 26, 2023

(54) MACHINE LEARNING SYSTEMS AND METHODS FOR DETERMINING HOME VALUE

(71) Applicant: Orchard Technologies, Inc., New York, NY (US)

(72) Inventors: Mark Jayne, New York, NY (US); Gergely Svigruha, New York, NY (US); Raymond Liang, Brooklyn, NY (US); Gregory Aponte, Austin, TX (US)

(73) Assignee: Orchard Technologies, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/739,286

(22) Filed: Jan. 10, 2020

(65) Prior Publication Data

US 2021/0110439 A1      Apr. 15, 2021

Related U.S. Application Data

(60) Provisional application No. 62/915,257, filed on Oct. 15, 2019.

(51) Int. Cl.
*G06Q 30/02* (2023.01)
*G06N 3/08* (2023.01)
(Continued)

(52) U.S. Cl.
CPC ....... *G06Q 30/0278* (2013.01); *G06F 18/214* (2023.01); *G06N 3/042* (2023.01);
(Continued)

(58) Field of Classification Search
CPC ........... G06K 9/00335; G06K 9/00771; G06K 9/6256; H01L 23/481; H01L 29/0653;
(Continued)

(56) References Cited

U.S. PATENT DOCUMENTS

| | | | |
|---|---|---|---|
| 7,286,699 B2 * | 10/2007 | Simard | G06V 10/454 382/187 |
| 7,415,356 B1 | 8/2008 | Gowda et al. | |

(Continued)

FOREIGN PATENT DOCUMENTS

| | | | |
|---|---|---|---|
| AU | 2007216858 A1 | 4/2008 | |
| AU | 2007216858 B2 | 4/2009 | |

(Continued)

OTHER PUBLICATIONS

Krizhevsky, A. et al. "ImageNet classification with deep convolutional neural networks." Communications of the ACM 60 (2012): 84-90. (Year: 2012).*

(Continued)

*Primary Examiner* — Lynda Jasmin
*Assistant Examiner* — Kimberly L Evans
(74) *Attorney, Agent, or Firm* — Wolf, Greenfield & Sacks, P.C.

(57) ABSTRACT

Techniques for determining value of a home by applying one or more neural network models to images of spaces in the home. The techniques include: obtaining at least one image of a first space inside or outside of a home; determining a type of the first space by processing the at least one image of the first space with a first neural network model; identifying at least one feature in the first space by processing the at least one image with a second neural network model different from the first neural network model and trained using images of spaces of a same type as the first space; and determining a value of the home at least in part by using the (Continued)

at least one feature as input to a machine learning model different from the first neural network model and the second neural network model.

22 Claims, 12 Drawing Sheets

(51) Int. Cl.
| | |
|---|---|
| *G06N 20/20* | (2019.01) |
| *G06Q 50/16* | (2012.01) |
| *G06F 18/214* | (2023.01) |
| *G06N 3/042* | (2023.01) |
| *G06N 3/045* | (2023.01) |
| *G06N 5/01* | (2023.01) |
| *G06V 10/764* | (2022.01) |
| *G06V 10/774* | (2022.01) |
| *G06V 10/80* | (2022.01) |
| *G06V 10/82* | (2022.01) |

(52) U.S. Cl.
CPC .............. *G06N 3/045* (2023.01); *G06N 3/08* (2013.01); *G06N 5/01* (2023.01); *G06N 20/20* (2019.01); *G06Q 50/16* (2013.01); *G06V 10/764* (2022.01); *G06V 10/774* (2022.01); *G06V 10/809* (2022.01); *G06V 10/82* (2022.01)

(58) Field of Classification Search
CPC ........... H01L 29/66734; H01L 29/7809; H01L 29/7813; H01L 29/945; A61B 5/0035; A61B 5/055; A61B 5/7264; A61B 5/7267; A61B 6/032; A61B 6/037; A61B 8/00; A61N 5/1039; G01R 33/481; G01R 33/4812; G01R 33/4814; G01R 33/5608; G06N 20/00; G06N 20/10; G06N 3/0445; G06N 3/0454; G06N 3/0472; G06N 3/0481; G06N 3/08; G06N 5/02; G06N 5/022; G06N 7/005; G06T 11/00; G06T 11/008; G06T 19/20; G06T 17/00; G06T 19/006; G06T 2207/10016; G06T 2207/10024; G06T 2207/10052; G06T 2210/04; G06T 7/521; G06T 7/579; G06T 7/593; H04N 13/10; H04N 13/106; H04N 13/156; H04N 13/204; H04N 13/246; H04N 2213/001; H04N 13/271; H04N 2013/0081; G01S 17/42; G01S 17/89; G01S 17/931; G01S 7/4812; G01S 7/4813; G01S 7/4815; G01S 7/4816; G01S 7/4817; G06Q 10/1053; G06Q 10/10; G06Q 10/06; G06Q 10/04; G06Q 10/1057; G06Q 10/063112; G06Q 30/0278; G06Q 50/16; G06F 16/9535; G06F 16/285; G06F 16/9577; G06F 40/20; G06F 40/205; G06F 40/237; G06F 40/40; G06F 16/24578; G06F 16/3334; G06F 16/735; G06F 40/284; G06F 40/30; G06F 7/24; Y10S 707/99942; Y10S 707/99943; G01V 1/302; G01V 1/345; G01V 2210/48; G01V 2210/63; G01V 2210/641; G01V 2210/643; G01V 2210/66; G06V 10/40
USPC .............. 705/1.1, 313; 700/19, 94; 345/649; 382/155, 156, 158, 103, 157, 187; 706/12, 15, 20, 26; 718/106; 353/78; 434/322
See application file for complete search history.

(56) References Cited

U.S. PATENT DOCUMENTS

| | | |
|---|---|---|
| 7,970,674 B2 | 6/2011 | Cheng et al. |
| 8,095,434 B1 | 1/2012 | Puttick et al. |
| 8,140,421 B1 | 3/2012 | Humphries et al. |
| 8,510,349 B1 | 8/2013 | Puttick |
| 8,515,839 B2 | 8/2013 | Ma et al. |
| 8,676,680 B2 | 3/2014 | Humphries et al. |
| 9,129,190 B1* | 9/2015 | Ranzato ................ G06V 10/82 |
| | | 382/156 |
| 9,424,305 B1 | 8/2016 | Puttick |
| 9,605,704 B1 | 3/2017 | Humphries et al. |
| 10,074,111 B2 | 9/2018 | Humphries et al. |
| 10,198,735 B1 | 2/2019 | Humphries et al. |
| 10,210,577 B1* | 2/2019 | Davis .................... G06Q 40/08 |
| | | 700/94 |
| 10,282,852 B1 | 5/2019 | Buibas et al. |
| 10,332,138 B1 | 6/2019 | Bruce et al. |
| 10,346,924 B1* | 7/2019 | Engelhorn ......... G06Q 30/0623 |
| | | 705/313 |
| 10,375,306 B2 | 8/2019 | Shan et al. |
| 10,423,861 B2 | 9/2019 | Gao et al. |
| 10,810,491 B1 | 10/2020 | Xia et al. |
| 11,392,625 B2 | 7/2022 | Strong et al. |
| 11,392,998 B1* | 7/2022 | Kwak ................ G06Q 30/0278 |
| | | 705/13 |
| 2005/0264768 A1* | 12/2005 | Kondo .................. G03B 21/10 |
| | | 353/78 |
| 2006/0256109 A1 | 11/2006 | Acker et al. |
| 2006/0265312 A1 | 11/2006 | Rascoff et al. |
| 2007/0185727 A1 | 8/2007 | Ma et al. |
| 2007/0185906 A1 | 8/2007 | Humphries et al. |
| 2007/0198278 A1 | 8/2007 | Cheng et al. |
| 2008/0077458 A1 | 3/2008 | Andersen et al. |
| 2009/0324010 A1* | 12/2009 | Hou .................... G06K 9/00771 |
| | | 382/103 |
| 2013/0304654 A1 | 11/2013 | Ma et al. |
| 2014/0180936 A1 | 6/2014 | Ma et al. |
| 2014/0236845 A1 | 8/2014 | Humphries et al. |
| 2014/0316999 A1 | 10/2014 | Cheng et al. |
| 2015/0379588 A1 | 12/2015 | Ma et al. |
| 2016/0162802 A1* | 6/2016 | Chickering ............ G06N 20/00 |
| | | 706/12 |
| 2018/0018508 A1* | 1/2018 | Tusch ................ G06K 9/00771 |
| | | 345/649 |
| 2018/0114334 A1* | 4/2018 | Desai ................... G06K 9/4604 |
| | | 706/12 |
| 2018/0260918 A1 | 9/2018 | VanderMey et al. |
| 2018/0300855 A1* | 10/2018 | Tang ..................... G06T 3/4053 |
| | | 382/156 |
| 2018/0330238 A1* | 11/2018 | Luciw .................. G06V 10/454 |
| | | 702/26 |
| 2019/0005553 A1 | 1/2019 | Humphries et al. |
| 2019/0012768 A1 | 1/2019 | Tafazoli Bilandi et al. |
| 2019/0020816 A1 | 1/2019 | Shan et al. |
| 2019/0020817 A1 | 1/2019 | Shan et al. |
| 2019/0026956 A1* | 1/2019 | Gausebeck ............ G06T 7/579 |
| | | 706/20 |
| 2019/0114511 A1* | 4/2019 | Gao ........................ G06N 3/08 |
| | | 381/155 |
| 2019/0236440 A1* | 8/2019 | Ho ....................... G06V 10/454 |
| | | 382/158 |
| 2019/0251402 A1 | 8/2019 | Godwin, IV et al. |
| 2019/0259293 A1* | 8/2019 | Hellman ................ G06F 40/30 |
| | | 434/232 |
| 2019/0297326 A1* | 9/2019 | Reda .................... H04N 19/132 |
| | | 709/200 |
| 2019/0354850 A1* | 11/2019 | Watson .................... G06N 3/08 |
| | | 382/156 |
| 2020/0005075 A1* | 1/2020 | Porter .................. G06K 9/3233 |
| | | 718/106 |
| 2020/0193206 A1* | 6/2020 | Turkelson ............. G06F 18/214 |
| | | 382/159 |

(56) References Cited

U.S. PATENT DOCUMENTS

| | | | | |
|---|---|---|---|---|
| 2020/0265328 A1* | 8/2020 | Kaditz | ............... | G06N 5/046 706/15 |
| 2020/0311871 A1* | 10/2020 | Yu | ..................... | G06T 5/003 382/157 |
| 2022/0044285 A1 | 2/2022 | Jayne et al. | | |

FOREIGN PATENT DOCUMENTS

| | | | | |
|---|---|---|---|---|
| CN | 101246485 A | | 8/2008 | |
| EP | 1903491 A1 | | 3/2008 | |
| GB | 2436159 A | | 9/2007 | |
| GB | 2437759 A | | 11/2007 | |
| WO | WO 2006/102244 A2 | | 9/2006 | |
| WO | WO 2006/102244 A3 | | 9/2006 | |
| WO | WO 2006/102245 A2 | | 9/2006 | |
| WO | WO 2006/102245 A3 | | 9/2006 | |
| WO | WO 2019/014620 A1 | | 1/2017 | |
| WO | WO 2018/051349 A1 | | 3/2018 | |
| WO | WO 2019/164484 A1 | | 8/2019 | |
| WO | WO-2019164484 A1 * | | 8/2019 | ............. G06K 9/626 |

OTHER PUBLICATIONS

Li, Yawei et al. "Learning Filter Basis for Convolutional Neural Network Compression." 2019 IEEE/CVF International Conference on Computer Vision (ICCV) (2019): 5622-5631. (Year: 2019).*

[No Author Listed], Zillow Unveils Smarter, More Accurate Zestimate That 'Sees' Unique Home Features, Incorporates Greater Real-Time Data. Zillow. Jun. 27, 2019:2 pages. http://zillow.mediaroom.com/2019-06-27-Zillow-Unveils-Smarter-More-Accurate-Zestimate-That-Sees-Unique-Home-Features-Incorporates-Greater-Real-Time-Data [last accessed Mar. 26, 2020].

Castellanos, Zillow Develops Neural Network to 'See' Like a House Hunter. Wall Street Journal. Nov. 11, 2016:3 pages. https://blogs.wsj.com/cio/2016/11/11/zillow-develops-neural-network-to-see-like-a-home-buyer/ [last accessed Mar. 26, 2020].

Humphries, Introducing a new and improved Zestimate algorithm. Zillow. Jun. 27, 2019:4 pages. https://www.zillow.com/tech/introducing-a-new-and-improved-zestimate-algorithm/ [last accessed Mar. 26, 2020].

Szegedy et al., Inception-v4, inception-resnet and the impact of residual connections on learning. ArXiv preprint arXiv:1602.07261. Aug. 23, 2016;2:12 pages.

Tan et al., EfficientNet: Rethinking Model Scaling for Convolutional Neural Networks. ArXiv preprint arXiv:1905.11946. Nov. 23, 2019;3:10 pages.

Zoph et al., Learning Transferable Architectures for Scalable Image Recognition. ArXiv preprint arXiv:1707.07012. Apr. 11, 2018;4:14 pages.

International Search Report and Written Opinion for International Application No. PCT/US2020/055473 dated Mar. 11, 2021.

PCT/US2020/055473, Dec. 31, 2020, Invitation to Pay Additional Fees.

PCT/US2020/055473, Mar. 11, 2021, International Search Report and Written Opinion.

Invitation to Pay Additional Fees for International Application No. PCT/US2020/055473 dated Dec. 31, 2020.

PCT/US2020/055473, Apr. 28, 2022, International Preliminary Report on Patentability.

International Preliminary Report on Patentability for International Application No. PCT/US2020/055473 dated Apr. 28, 2022.

* cited by examiner

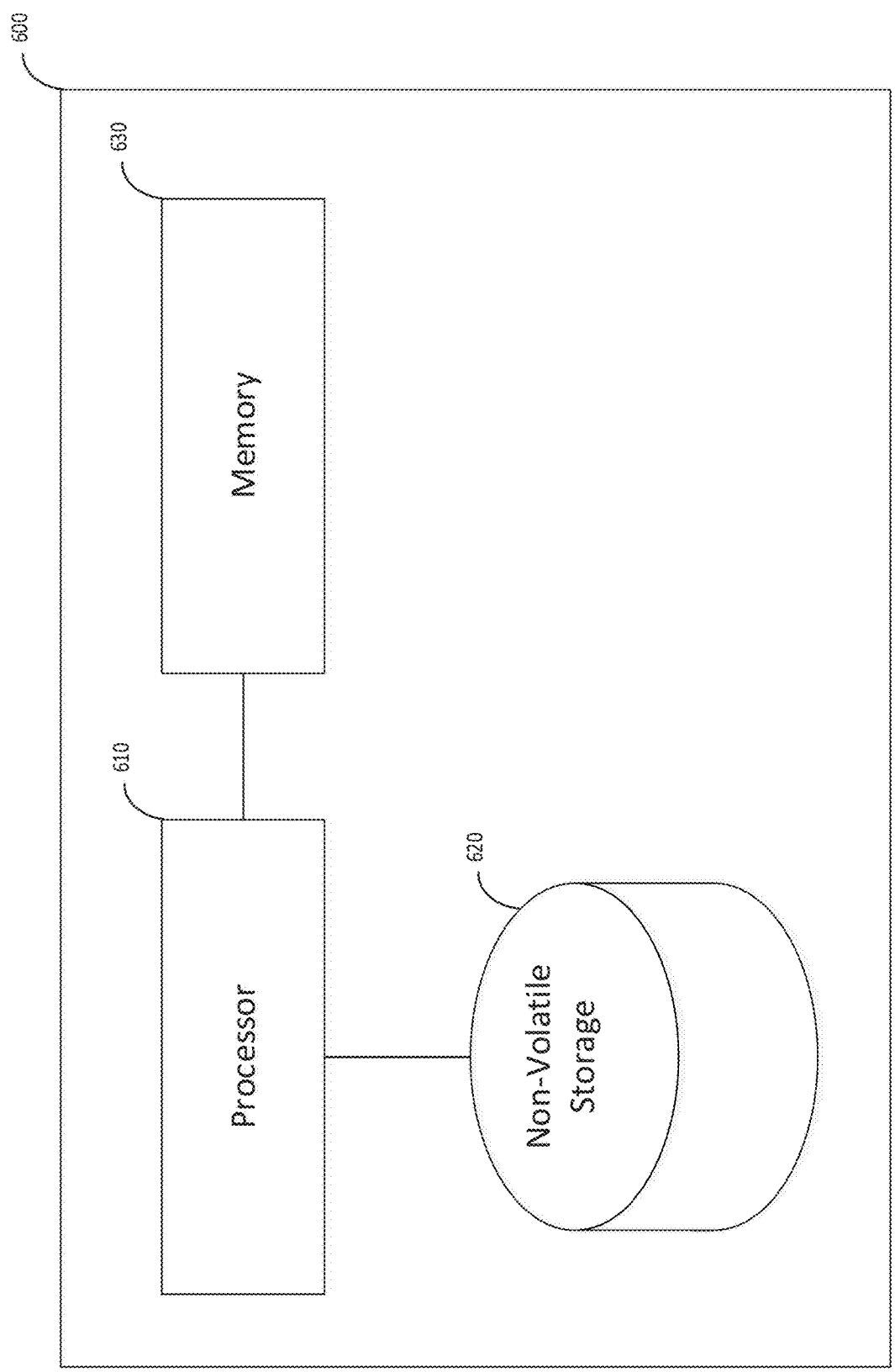

MACHINE LEARNING SYSTEMS AND METHODS FOR DETERMINING HOME VALUE

CROSS-REFERENCE TO RELATED APPLICATIONS

This application claims the benefit of priority under 35 U.S.C. § 119(e) to U.S. Provisional Patent Application Ser. No.: 62/915,257, titled "MACHINE LEARNING SYSTEMS AND METHODS FOR DETERMINING HOME VALUE", filed on Oct. 15, 2019, which is incorporated by reference herein in its entirety.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Buying or selling a home involves estimating the value of the home. The home's estimated value can be used in a number of ways including, but not limited to, determining the price at which to offer the home for sale, determining an amount that a buyer is willing to offer to pay for a home, underwriting a mortgage, and underwriting an insurance policy for the home. In all these applications, it is important to get an accurate estimate of the home's value.

Typically, the value of a home is determined manually by realtors and/or home appraisers by doing a comparative market analysis. A comparative market analysis involves looking at recently sold homes that are similar in their size, location, number of bedrooms and bathrooms, style, home type (e.g., single-family, townhouse, condominium, etc.), condition of the home, age of the home, and the prices for which these homes were sold.

SUMMARY

Some embodiments are directed to a system, comprising: at least one computer hardware processor; and at least one non-transitory computer-readable storage medium storing processor executable instructions that, when executed by the at least one computer hardware processor, cause the at least one computer hardware processor to perform: obtaining at least one image of a first space inside or outside of a home; determining a type of the first space by processing the at least one image of the first space with a first neural network model; identifying at least one feature in the first space by processing the at least one image with a second neural network model different from the first neural network model and trained using images of spaces of a same type as the first space; and determining a value of the home at least in part by using the at least one feature as input to a machine learning model different from the first neural network model and the second neural network model.

Some embodiments are directed to at least one non-transitory computer-readable storage medium storing processor executable instructions that, when executed by the at least one computer hardware processor, cause the at least one computer hardware processor to perform: obtaining at least one image of a first space inside or outside of a home; determining a type of the first space by processing the at least one image of the first space with a first neural network model; identifying at least one feature in the first space by processing the at least one image with a second neural network model different from the first neural network model and trained using images of spaces of a same type as the first space; and determining a value of the home at least in part by using the at least one feature as input to a machine learning model different from the first neural network model and the second neural network model.

Some embodiments are directed to a method, comprising: using at least one computer hardware processor to perform: obtaining at least one image of a first space inside or outside of a home; determining a type of the first space by processing the at least one image of the first space with a first neural network model; identifying at least one feature in the first space by processing the at least one image with a second neural network model different from the first neural network model and trained using images of spaces of a same type as the first space; and determining a value of the home at least in part by using the at least one feature as input to a machine learning model different from the first neural network model and the second neural network model.

The foregoing is a non-limiting summary of the invention, which is defined by the attached claims.

BRIEF DESCRIPTION OF THE DRAWINGS

Various aspects and embodiments of the disclosed technology will be described with reference to the following figures. It should be appreciated that the figures are not necessarily drawn to scale.

FIG. 6 is a diagram of an illustrative computer system on which embodiments described herein may be implemented.

DETAILED DESCRIPTION

Figure 1:
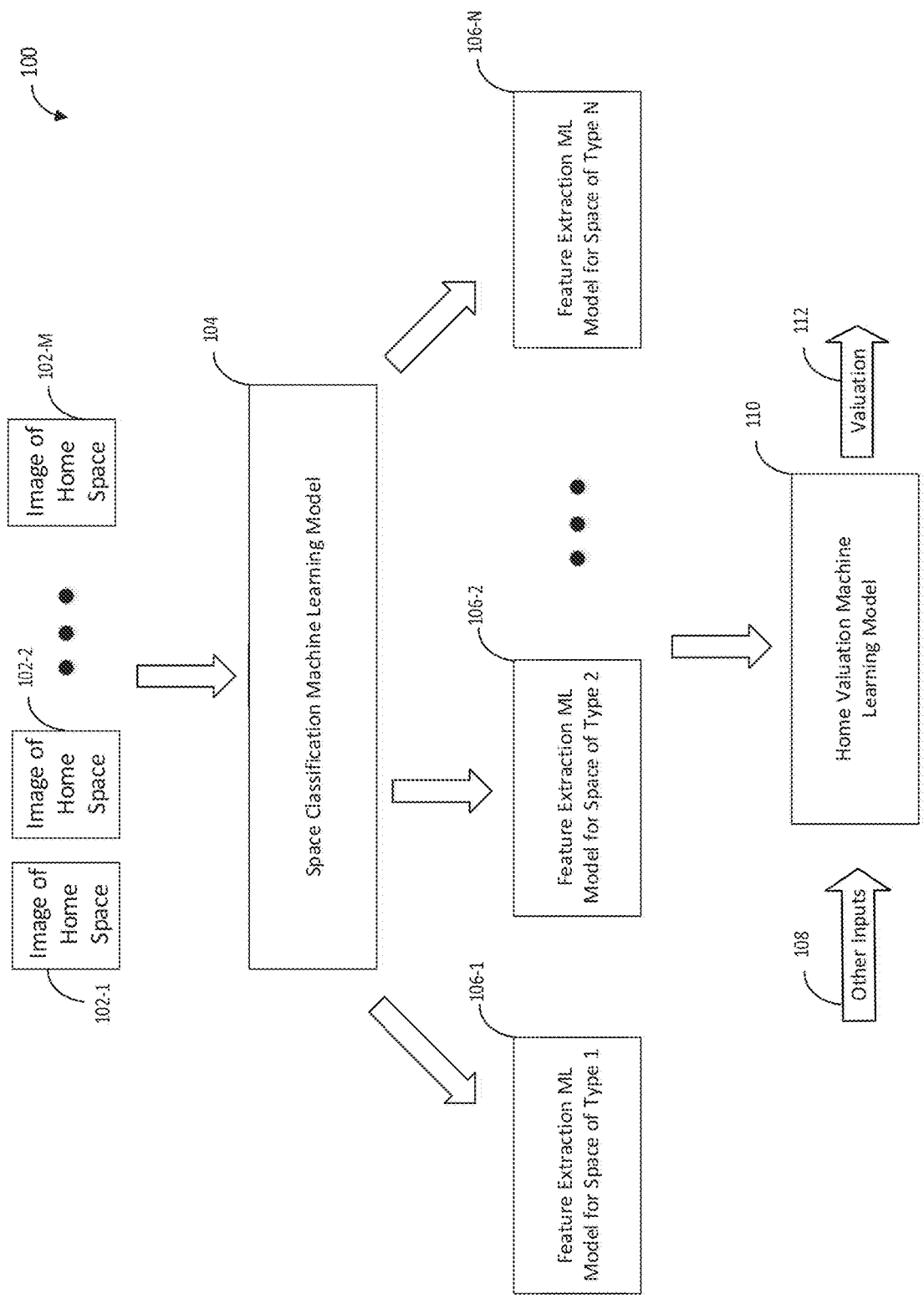
FIG. 1 is a diagram of a technique of using multiple machine learning models for processing images of a home to determine a value of the home, in accordance with some embodiments of the technology described herein.

Comparative market analysis techniques for determining the value of a home have a number of drawbacks. First, they are performed manually requiring a realtor or appraiser to be retained for determining the value of each home of interest. The process of identifying such an individual and waiting for that individual to perform and complete the analysis is time consuming and expensive. It does not scale—an appraiser cannot automatically determine the value of a large number of homes (e.g., at least 50, at least 100, at least 1000, at least 5000) in a short amount of time (e.g., within a day) especially when these homes are different from one another (e.g., different geographic markets or neighborhoods, different sizes, different styles, etc.) and require comparison to different types of properties to determine their value. Aside from the inability to scale home valuation, comparative market techniques suffer from lack of accuracy and repeatability—the process is subjective and depends on the whims of the person performing the analysis.

Although there are some automated techniques available for determining a home's value, such techniques typically involve obtaining data from multiple listing service (MLS) listings and estimating the price from such data. However, MLS data is often incomplete and inaccurate, and using such data in isolation results in inaccurate estimates of home values even if such estimates can be performed rapidly.

To address these shortcomings of conventional home valuation techniques, the inventors have developed automated techniques for rapidly estimating value of a home by using machine learning methods, developed by the inventors, to analyze images of the home to extract features that are predictive of and can be used to predict the home's value. In particular, the techniques developed by the inventors involve obtaining multiple images of a home and processing these images using a series of machine learning models to arrive at the home's value. In some embodiments, each image of a home is processed by a first machine learning model (e.g., a neural network model) to identify the type of space shown in the image (e.g., backyard, porch, bedroom, kitchen, etc.). After the type of space is identified for an image, one or more additional machine learning models (e.g., neural networks) are applied to the image in order to identify features of the home that are expected to be found in that type of space (e.g., to determine the quality of the grass in the backyard, to determine the type of granite in the kitchen, to determine the material floors are made from in the living room, etc.). In turn, the identified features may be used, optionally in combination with one or more other features, to predict the value of the home using another machine learning model. The resultant pipeline is automated and, in some embodiments, does not involve any human intervention to obtain a home value from the images of the home.

As described herein, the inventors have not only developed the above-described home valuation pipeline, but also the machine learning models used as part of the pipeline. The developments include novel architecture of the underlying machine learning models as well as the techniques for training the machine learning models including innovative data augmentation, data labeling, and performance evaluation steps.

Some embodiments described herein address all of the above-described issues that the inventors have recognized with conventional techniques for home valuation. However, not every embodiment described herein addresses every one of these issues, and some embodiments may not address any of them. As such it should be appreciated that embodiments of the technology described herein are not limited to addressing all or any of the above-described issues of conventional techniques for home valuation.

Accordingly, some embodiments provide for a method comprising: (1) obtaining at least one image of a first space inside or outside of a home; (2) determining a type of the first space by processing the at least one image of the first space with a first neural network model; (3) identifying at least one feature in the first space by processing the at least one image with a second neural network model different from the first neural network model and trained using images of spaces of a same type as the first space; and (4) determining a value of the home at least in part by using the at least one feature as input to a machine learning model different from the first neural network model and the second neural network model.

For example, in some embodiments, an image of a home's yard may be processed by the first neural network model to determine that the image is of the yard. Upon determining that the image is of a yard, a neural network model trained to determine the quality of the grass in the yard may be applied to the image in order to determine the quality of the grass. A second image of the home may be processed to determine that it is an image of a bathroom. Upon determining that the second image is of the bathroom, a neural network model trained to determine the number of sinks (e.g., a single sink or double sinks) in the bathroom may be applied to the second image in order to determine the number of sinks in the bathroom. A third image of the home may be processed to determine that it is an image of the kitchen and, upon this determination being made, a neural network model trained to determine the finish of the appliances (e.g., stainless steel vs. not) may be applied to the third image in order to determine the finish of the kitchen appliances in the home. One or more additional features may be determined by applying one or more neural network models (or other machine learning models) to the images. In turn, the image-derived features may be provided as input to a machine learning model (e.g., a random forest model, a neural network, etc.) to determine a value for the home.

In some embodiments, the first space may be a space inside of a home, such as a room or hallway, or a space outside the home, such as a yard or porch. For example, the space inside a home may be a front yard, a back yard, a side yard, a porch, a garage, a living room, a bedroom, a kitchen, a bathroom, a dining room, a family room, a basement, an attic, a closet, a laundry room, a foyer, a hallway, or a mud room. The image of the first space may include only the first space (e.g., a picture of the kitchen and no other room) or multiple spaces (e.g., a picture including both a kitchen and a dining room or any other space adjoining the kitchen).

In some embodiments, the first neural network model may be a deep neural network model and may include one or more convolutional layers, one or more fully connected (or densely connected) layers, one or more transposed convolutional layers, one or more pooling layers (e.g., an average pooling layer, a maximum pooling layer), one or more dropout layers, and/or any other suitable type of layer(s).

Figure 3A:
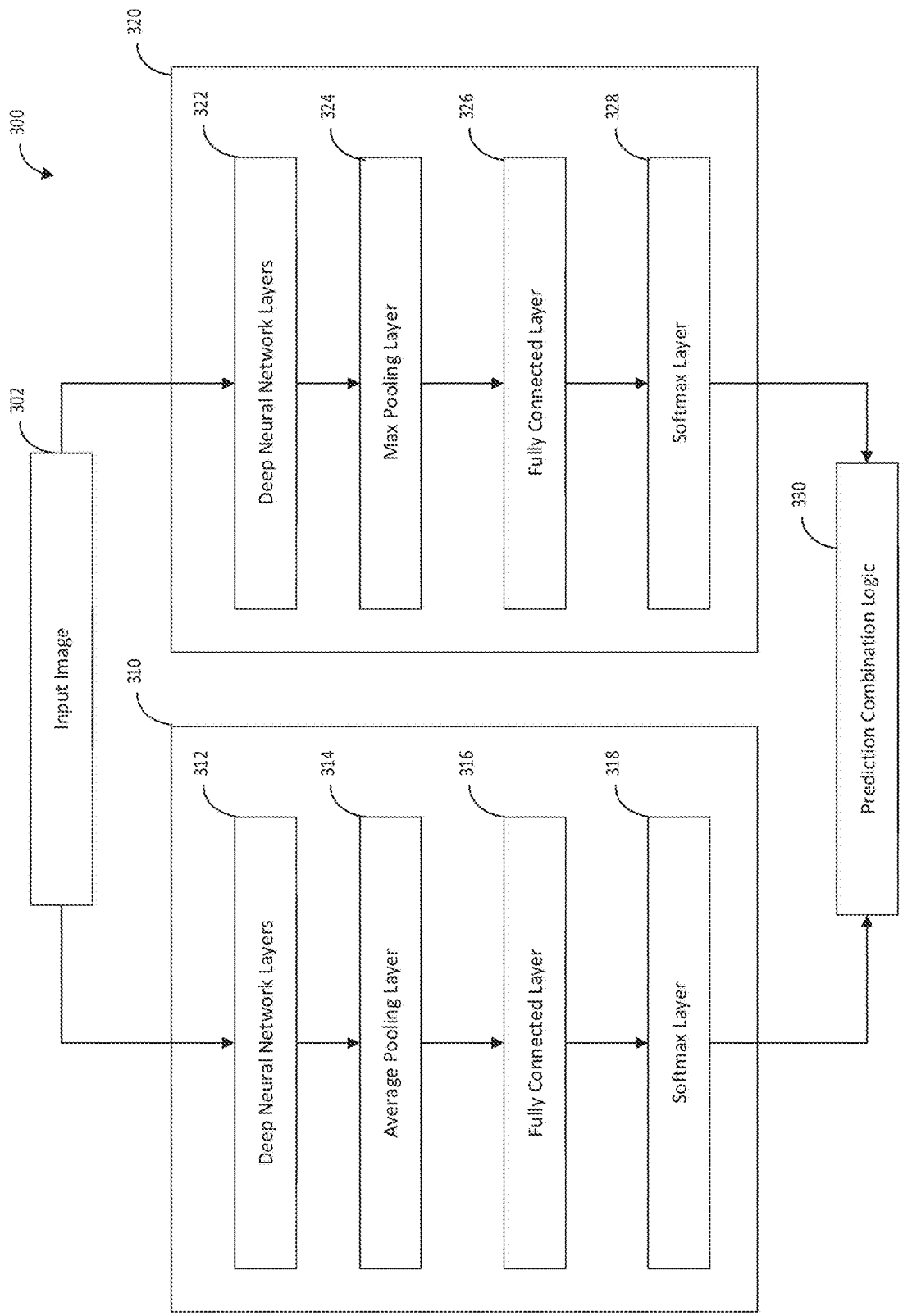
FIG. 3A is a diagram of an illustrative neural network model 300 configured to process an image of a space of a home to determine the type of the space, in accordance with some embodiments of the technology described herein.

In some embodiments, the first neural network model may include two neural network sub-models (e.g., as shown in the illustrative neural network architecture shown in FIG. 3A) with one neural network sub-model having an average pooling layer and the other neural network sub-model having a max pooling layer instead of the average pooling layer.

In some embodiments, processing an image of a first space with the first neural network includes: (1) processing the at least one image using the first sub-model to obtain first results; (2) processing the least one image using the second sub-model to obtain second results; and (3) combining (e.g., averaging) the first and second results to obtain an output result for the first neural network model.

In some embodiments, the first neural network may be trained using a transfer learning technique. For example, at least some of the parameter values of the first neural network may be initialized to values obtained, earlier, by training a different neural network on other image data. Next, the parameter values of the first neural network may be updated by training the first neural network using images of home spaces, each of which is labeled with the type of space it depicts.

The inventors have recognized that training data labels may sometimes be incorrect, which would adversely impact the performance of any machine learning model trained using such training data. For example, if images of home spaces are labeled incorrectly (e.g., an image of a kitchen is incorrectly labeled as an image of a bathroom), using such images to train the first neural network model might lead the trained neural network model to make errors (e.g., by incorrectly classifying images of a kitchen as being images of a bathroom).

Accordingly, in some embodiments, the output of a neural network model may be used to detect training data labeling mistakes by identifying incorrectly labeled image data. In some embodiments, the first neural network model may be applied to process one or more of the images on which it was trained and, when the output of the first neural network model for an image differs from the label of the image, the image may be identified as one that may be incorrectly labeled. In response to identifying that the image may be incorrectly labeled, the label may be changed to a different label either manually or automatically (e.g., by setting the label to match the output of the first neural network when applied to the image). After one or more training data image labels are changed, the first neural network may be trained using the updated training data with corrected labels. In this way, one or more parameter values of the first neural network may be updated using the updated training data, resulting in improved performance.

For example, if one out of 100 images of a kitchen is mistakenly labeled as a bathroom, and the neural network model is trained on these 100 images, then applying the neural network model to the mislabeled image may nonetheless result in the correct output of "kitchen". This is because the neural network would recognize the mislabeled image to be similar to the other 99 kitchen images. In response to determining that the neural network output of "kitchen" for the image is different from the label of the image (i.e., "bathroom), the image may be relabeled either manually or automatically (e.g., by substituting the output of the neural network of "kitchen", which is correct, for the original label of "bathroom", which is incorrect).

According in some embodiments, the first neural network model may be used to process multiple images to identify one or more images for which the first neural network model output differs from labels produced by manual classification. New labels may be obtained for at least some of the identified images, and one or more parameters of the first neural network model may be updated by using at least some of the images having the new labels.

Similar techniques may be used to detect labeling errors for training data used to train other machine learning models described herein, including any neural network model for identifying room features (e.g., the second neural network model described above) and the machine learning model for predicting home values using the identified room features.

In some embodiments, the second neural network model may be a deep neural network model. The second neural network model may include one or more convolutional layers, one or more residual connections, and/or may use a bank of convolutional kernels having different resolutions. Like the first neural network model, in some embodiments, the second neural network model may be trained using transfer learning.

As described above, the second neural network model may be configured to identify one or more features of a space of a home by processing an image of the space. For example, the first space may be a kitchen, and the second neural network model may be configured to process an image of the kitchen to identify a type of material of a countertop in the kitchen. As another example, the first space may be a kitchen, and the second neural network model may be configured to process an image of the kitchen to identify a finish of an appliance in the kitchen. As yet another example, the first space may be a yard, and the second neural network model may be configured to process an image of the yard to identify the condition of the grass in the yard.

Following below are more detailed descriptions of various concepts related to, and embodiments of, machine learning systems and methods for determining a home's value from images of spaces in the home. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

FIG. 1 is a diagram of a technique 100 of using multiple machine learning models for processing images of a home to determine a value of the home, in accordance with some embodiments of the technology described herein. In the illustrative embodiment of FIG. 1, multiple images 102-1, 102-2, . . . , 102-M of spaces in a home may be provided as input to a space classification machine learning model 104. The space classification machine learning model 104 may be configured to identify, for an input image, the home space(s) likely to be in the input image.

After the images 102-1, 102-2, . . . , 102-M are associated with the type of space they are depicting, one or more feature extraction machine learning models 106-1, 106-2, . . . , 106-N are applied to the images 102-1, 102-2, . . . , 102-M in order to identify home features to be used for determining the value of a home. For example, if some of the images are identified as being images of a space of type 1 (e.g., a kitchen), then one or more feature extraction machine learning models trained to identify kitchen features (e.g., countertop material, appliance finishes, etc.) may be applied to the images identified (by model 104) as being kitchen images. As another example, if some of the images are identified as being images of a space of type 2 (e.g., a yard), then one or more feature extraction machine learning models trained to identify yard features (e.g., grass quality, presence of a shed, etc.) may be applied to the images identified (by model 104) as being yard images. As yet another example, if some of the images are identified as being images of a space of type 3 (e.g., a living room), then one or more feature extraction machine learning models trained to identify living room features (e.g., presence of built-in shelves, presence of crown molding, presence of ceiling fan, etc.) may be applied to the images identified (by model 104) as being living room images. These examples are merely illustrative and other examples of types of spaces (both indoor and outdoor) and features of those spaces are provided herein.

The features identified using feature extraction machine learning models 106-1, 106-2, . . . , 106-N are provided as input to home valuation machine learning model 110 along with one or more other inputs 108 (examples of which are provided herein) to produce a valuation for the home. As may be appreciated, the technique 100 may be applied to multiple homes and because the entire technique is automated, it may be used to determine a value of many homes (e.g., at least ten, at least 100, at least 500, at least 1000, at least 5000, between 100 and 10,000 homes) in a short period of time (e.g., within an hour, within five hours, within 12 hours, within one day), which is not possible using conventional comparative market analysis techniques described above.

Any suitable number of images of a home may be used as part of technique 100 and the images may be obtained from any suitable source or sources. For example, in some embodiments, the images of the home may be obtained from an MLS listing of the home. As another example, the images of the home may be provided by a home owner, home maintenance company, realtor, appraiser, or any other person or entity having images of the home. The images may be in any suitable format, as aspects of the technology described herein are not limited in this respect. In some embodiments, the images may be color images. In some embodiments, the images may be grayscale images.

The images used as part of the technique illustrated in FIG. 1 may be of any suitable resolution. However, in some embodiments, higher resolution images may be used to facilitate extraction of certain image features from the images. For example, in some embodiments, images provided as input to the space classification machine learning model 104 may have a lower resolution (e.g., 300×300 pixels per color channel) than the images provided as input (e.g., 600×600 pixels per color channel) to one or more feature extraction machine learning models 106. The inventors have observed that using lower-resolution images for space classification than for feature extraction is advantageous because it results in accurate space classification results, while reducing the computing resources (e.g., processing power, memory usage, etc.) required for processing the images with the space classification model 104 (and it reduces the computing resources required to train the space classification model 104 as well).

The images 102-1, . . . , 102-M may be of any suitable space of a home and the space classification machine learning model 104 may be configured to classify each of the images as depicting any of numerous types of spaces. For example, the space classification machine learning model 104 may be configured to classify an input image as an image of any types of space including, but not limited to, an indoor space, an outdoor space, a yard (e.g., a side yard, a back yard, a front yard), a porch (e.g., front porch, back porch, three-season porch, partially enclosed porch, etc.), a garage, a living area (e.g., a living room), a bedroom, a kitchen, a bathroom, a dining room, a family room, a basement, an attic, a closet, a laundry room, a foyer, a hallway, a mud room. In some embodiments, the machine learning model 104 may be configured to classify an input image as showing the back of the home, the front of the home, and/or a floorplan of the home. In some embodiments, the machine learning model may be configured to classify an input image as being an image of multiple spaces (e.g., kitchen and living area). In some embodiments, the machine learning model may be configured to classify an input image as being of a space not part of a home or property.

In some embodiments, the space classification machine learning model 104 may be configured to process an input image and output, for each of multiple types of spaces, a respective probability that the input image shows that type of space. When the largest among these probabilities is greater than a specified threshold (e.g., greater than 0.5, greater than 0.6, greater than 0.7, greater than 0.8, greater than 0.9) the type of space associated with the largest probability may be identified as the type of space in the image. The type of space may then be associated with the input image. When none of the probabilities exceeds the specified threshold, the space classification model 104 may be configured to output an indication that no space classification has been made. In some embodiments, the machine learning model 104 may output not only the most likely type of space shown in an input image, but also the probability that this is so. Optionally, the machine learning model 104 may output the probabilities that an input image shows one or more other types of spaces.

Figure 4A:
FIGS. 4A-4H are illustrative examples of images of spaces in a home that may be provided as inputs to a neural network model to determine the type of space in each image, in accordance with some embodiments of the technology described herein.
Figure 4B:
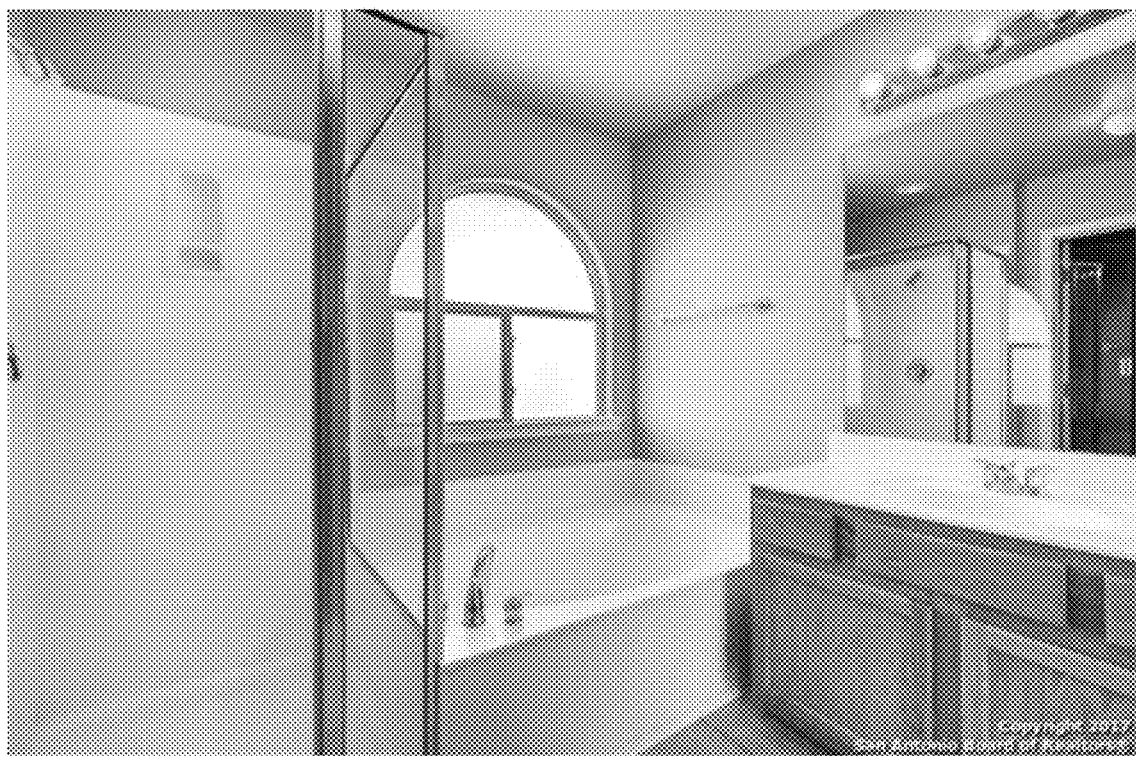
Figure 4C:
Figure 4D:
Figure 4E:
Figure 4F:
Figure 4G:
Figure 4H:
Figure 5A:
FIGS. 5A-5D are illustrative examples of images of spaces in a home that may be provided as inputs to one or more neural network models configured to process the images and identify, in the images, one or more features indicative of the home's value, in accordance with some embodiments of the technology described herein.
Figure 5B:
Figure 5C:
Figure 5D:

FIGS. 4A-4H are illustrative examples of images of spaces in a home that may be provided as inputs to a space classification machine learning model 104 to determine the type of space in each image, in accordance with some embodiments of the technology described herein. In one example, when the space classification ML model 104 is applied to the image shown in FIG. 4A, the model 104 may indicate that the probability that the image in FIG. 4A shows the back of a home is 99.86%. In another example, when the space classification ML model 104 is applied to the image shown in FIG. 4B, the model 104 may indicate that the probability that the image in FIG. 4B shows a bathroom is 100%. In another example, when the space classification ML model 104 is applied to the image shown in FIG. 4C, the model 104 may indicate that the probability that the image in FIG. 4C shows a bedroom is 99.9%. In another example, when the space classification ML model 104 is applied to the image shown in FIG. 4D, the model 104 may indicate that the probability that the image in FIG. 4D shows the front of a home is 100%. In another example, when the space classification ML model 104 is applied to the image shown in FIG. 4E, the model 104 may indicate that the probability that the image in FIG. 4E shows an interior room is 59.5%. In another example, when the space classification ML model 104 is applied to the image shown in FIG. 4F, the model 104 may indicate that the probability that the image in FIG. 4F shows a kitchen is 99.76%. In another example, when the space classification ML model 104 is applied to the image shown in FIG. 4G, the model 104 may indicate that the probability that the image in FIG. 4G shows a kitchen and a main living area is 97.46%. In another example, when the space classification ML model 104 is applied to the image shown in FIG. 4H, the model 104 may indicate that the probability that the image in FIG. 4H shows a living area is 92.83%.

The space classification machine learning model 104 may be any suitable type of machine learning model. For example, the space classification machine learning model 104 may be a neural network model (e.g., a deep neural network model with one or more convolutional layers). An illustrative architecture of the space classification machine learning model 104 is described below with reference to FIG. 3A. However, it should be appreciated that the space classification machine learning model 104 is not limited to being a neural network model. For example, in some embodiments, the space classification machine learning model 104 may be a random forest model, a graphical model (e.g., a Markov random field model), a support vector machine, a radial basis function regression model, a linear regression model, a non-linear regression model, and/or any other suitable type of machine learning model, as aspects of the technology described herein are not limited in this respect.

After space classification is performed, one or more feature extraction ML models 106 may be applied to identify one or more features to use for predicting the value of a home. Different ML models 106 may be applied to images of different types of spaces. In some embodiments, one or more feature extraction ML models 106 may be trained for each of one or more different space types. For example, one or more feature extraction ML models may be trained to identify a respective one or more features in a kitchen, one or more other feature extraction ML models may be trained to identify a respective one or more features in a living room, one or more other feature extraction ML models may be trained to identify a respective one or more features in a yard, etc.

In some embodiments, a feature extraction model trained to identify home features from images of a living area (e.g., living room, family room, den, etc.) may be applied to living area images to identify features including, but not limited to, the type of flooring in the living area (e.g., hardwood, carpet, tile, etc.), whether the living room includes a fireplace, whether the living area includes a ceiling fan, whether the living area includes crown molding, the type of ceiling in the living area (e.g., flat, tray ceiling, coffered ceiling, etc.), whether the living area includes built-in furniture (e.g., built-in shelves), whether the living area includes light fixtures and the types of light fixtures included, and the layout of the living area.

In some embodiments, a feature extraction model trained to identify home features from images of a kitchen may be applied to kitchen images to identify features including, but not limited to, the type of cooktop in the kitchen, the color of the dishwasher (e.g., stainless, black, white, paneled, etc.), the color of the microwave, the type of the microwave (e.g., above-the-range, in an island, countertop, etc.), the type of oven, whether there are double ovens or a single oven, the color of the refrigerator, whether the refrigerator has an ice maker, the type of the refrigerator, whether the stove has ventilation and what type (e.g., hood, microwave-based, none, etc.), whether the kitchen includes backsplash, backsplash material, how many kitchen cabinets and what type of kitchen cabinets are in the kitchen, the material of the kitchen countertop (e.g., quartz, granite, Formica, tile, Corian, etc.), the type of flooring in the kitchen, whether the kitchen has an island, the size of the kitchen island, whether the island is counter or bar-height seating, whether the kitchen includes lighting fixtures and their type.

In some embodiments, a feature extraction model trained to identify home features from images of a bathroom may be applied to bathroom images to identify features including, but not limited to, whether the bathroom has cabinets and, if so, how many, the type of countertop in the bathroom, whether the bathroom includes a tub, whether the bathroom includes a shower, whether the bathroom includes a tub and a shower, whether the shower includes multiple shower heads, whether the bathroom includes a single sink or double sinks, the type of flooring in the bathroom, whether there are tiles in the bathroom, the wall colors in the bathroom (e.g., pink and green colors may indicate an older bathroom).

In some embodiments, a feature extraction model trained to identify home features from images of a backyard may be applied to backyard images to identify features including, but not limited to, whether there is any separate exterior structure in the backyard (e.g., a swing set), whether there is storage in the backyard (e.g., a shed), whether there is a fence and, if so, the type of fence and material from which the fence is made, whether there is a pool and, if so, the type and/or size of the pool, whether the backyard includes a fountain, whether the backyard includes an outdoor kitchen, whether the backyard includes a fire pit, whether the backyard includes a utility box, the type of the backyard, the quality of the grass in the backyard, whether the backyard has shade, whether the backyard includes trees, whether the backyard includes young or mature trees, whether the backyard has a view, whether there are power lines in the image, whether there is a slope to the backyard, whether the backyard is flat, whether the backyard includes an exterior home structure (e.g., a pergola), whether the backyard includes an enclosed structure.

In some embodiments, a feature extraction model trained to identify home features from images of a backyard may be applied to backyard images to identify features including, but not limited to, whether the home has exterior siding, whether the house is elevated relative to its front yard, the orientation of the front yard, the style of the front yard, whether there is any storage on the front yard, whether there is a garage, whether there is a driveway and, if so, it's length and type (e.g., asphalt, dirt, gravel, etc.), whether the driveway is sloped or flat, whether there is a walkway and, if so, the type of material (e.g., asphalt, pavers, gravel, stone, etc.), whether there is a porch, whether there is a balcony, whether there is grass and, if so, the quality of the grass, quality of the landscaping, whether there are trees and, if so, their maturity and placement, whether there is a fence and, if so, its type, orientation and material, whether there is a sidewalk, whether the front of the home has masonry, whether the front of the home includes a well, and whether the front of the home includes a fountain.

It should be appreciated that the above-described home features are merely illustrative and that, in some embodiments, machine learning techniques may be used to identify one or more other features from images (of the same or other types of home spaces from those listed above) in addition to or instead of the features described above, as aspects of the technology described herein are not limited in this respect.

In some embodiments, a separate feature extraction ML model 106 may be trained for each feature to be extracted from images of the home. However, in some embodiments, a single feature extraction ML model 106 may be trained to identify multiple features from an input image. For example, when two features are correlated (e.g., oven color and oven type), a single feature extraction ML model 106 may be trained to extract both features from a single input image.

A feature extraction ML model 106 may be any suitable type of machine learning model. For example, a feature extraction ML model 106 may be a neural network model (e.g., a deep neural network model with one or more convolutional layers). An illustrative architecture of a feature extraction ML model is described below with reference to FIG. 3B. However, it should be appreciated that the feature extraction ML model 106 is not limited to being a neural network model. For example, in some embodiments, the feature extraction ML model 106 may be a random forest model, a graphical model (e.g., a Markov random field model), a support vector machine, a radial basis function regression model, a linear regression model, a non-linear regression model, and/or any other suitable type of machine learning model, as aspects of the technology described herein are not limited in this respect.

FIGS. 5A-5D are illustrative examples of images of spaces in a home that may be provided as inputs to one or more feature extraction machine learning models 106 configured to process the images and identify, in the images, one or more features indicative of the home's value, in accordance with some embodiments of the technology described herein. In one example, when a feature extraction ML model 106 is applied to the image of a kitchen shown in FIG. 5A, the model 106 may indicate that the probability that the image in FIG. 5A includes a stone countertop is 63.96%. In another example, when a feature extraction ML model 106 is applied to the image of a bathroom shown in FIG. 5B, the model 106 may indicate that the probability that the image in FIG. 5B includes a vanity top is 86.21%. In another example, when a feature extraction ML model 106 is applied to the image of a front yard shown in FIG. 5C, the model 106 may indicate that the probability that the front yard is well maintained is 91.42%. In another example, when a feature extraction ML model 106 is applied to the image of a backyard shown in FIG. 5D, the model 106 may indicate that the probability that backyard is well maintained is 91.42%.

Returning to FIG. 1, as described above, any home features extracted from images using the machine learning models 106-1, ..., 106-N are provided as input to a machine learning model for predicting the price of a home. For example, providing the home features extracted from the images shown in FIG. 5A-5D, which are all from the same home as input to the machine learning model 110 produces, as the output of model 110, an estimate of $192,169 for the price of the home. The home recently sold for $200,000—the estimate error was within 3.9%.

Also, as shown in FIG. 1, in some embodiments, one or more other features 108 may be provided as input to the ML model 110 in addition to the image-derived features described above. These features may be obtained from any suitable source such as, for example, an MLS listing for a home. The features may include for example any one or more of the following example features: appraised value per square foot, appraised land value per square foot, appraised raw land value, appraised home value, area of each floor of the home (e.g., basement, first floor, second floor, etc.), total square feet, location of home, latitude and/or longitude of home, zip code of home, address of home, city or town of home, county for tax purposes, exterior type of home, lot size, amount of time listed on MLS, etc.

It should be appreciated that, in some embodiments, only image-derived features may be used as input to the ML model 110 to predict the value of a home. In other embodiments one or more (e.g., two, five, between 2 and 10, between 10 and 20, all) of the above described or other features may be used in addition to the image-derived home features.

As described herein, ML model 110 may be any suitable type of machine learning model, as aspects of the technology described herein are not limited in this respect. For example, in some embodiments, the ML model 110 may be a tree-based model, such as a random forest model (which may be trained using, for example, gradient boosting). In other embodiments, the ML model 110 may be a neural network model or another of machine learning model.

Figure 2:
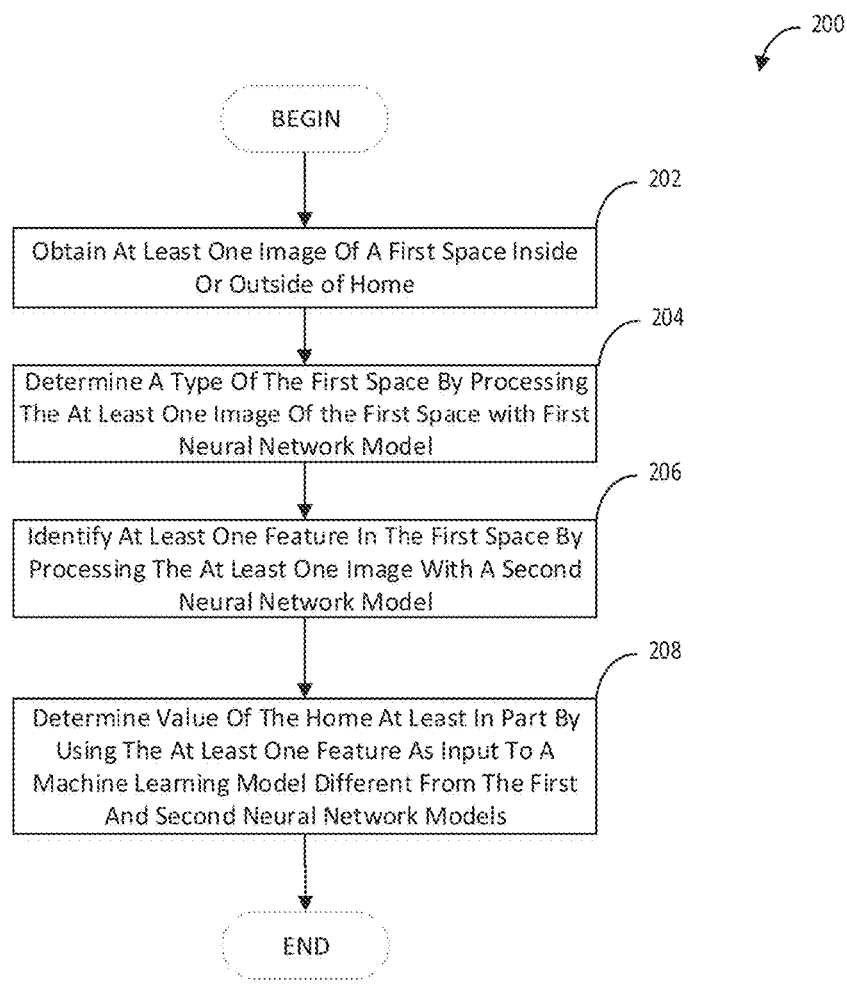
FIG. 2 is a flowchart of an illustrative process of using multiple machine learning models for processing images of a home to determine a value of the home, in accordance with some embodiments of the technology described herein.

FIG. 2 is a flowchart of an illustrative process 200 of using multiple machine learning models for processing images of a home to determine the value of the home, in accordance with some embodiments of the technology described herein. Process 200 may be executed by using any suitable computing device or devices, which may be located in a single physical location or distributed among different physical locations.

Process 200 begins at act 202, where at least one image of a first space inside or outside of a home is obtained. The at least one image may include any suitable number of images (e.g., one, at least two, at least five, at least ten, at least 20, between 5 and 50, between 10 and 100, or any other suitable number or range contained within these ranges). The images may be of any spaces inside or outside of a home. Examples of such spaces are provided herein. The images may be of any suitable resolution as described herein and may be in any suitable format, as aspects of the technology described herein are not limited in this respect.

Next, process 200 proceeds to act 204, where the type of the first space is determined by processing the at least one image with a first neural network model. The first neural network model may be provided an image of a space as input and provide as output an indication of the most likely type of space in the home that the image depicts. In some embodiments that indication may be probabilistic such that the output of the first neural network model may indicate not only the most likely type of space being depicted in an image, but also the probability that this is the case. For example, the output may indicate that an image depicts a kitchen and provide a probability (e.g., 89%) that this is so. Additionally, the output may provide an indication for the likelihood that each of multiple types of spaces is shown in the image together with a corresponding probability. For example, the output may indicate that an image depicts a bedroom with a probability of 75%, a dining room with a probability of 10%, a living room with a probability of 8%, and a basement with a probability of 7%.

In some embodiments, the first neural network model may be a deep neural network having one or more convolutional layers, one or more pooling layers, one or more fully connected layers and/or a softmax layer. An illustrative architecture of the first neural network is shown in FIG. 3A, described below. It should be appreciated that, in some embodiments, any suitable type of space classification machine learning model may be used at act 204, as aspects of the technology described herein are not limited to using neural network models for space classification. For example, any of the machine learning models described herein with reference to space classification model 104 may be used. And even if a neural network model were used, in some embodiments with the architecture shown in FIG. 3A, in other embodiments a different neural network architecture may be employed.

Next, process 200 proceeds to act 206, where at least one feature in the first space is identified by processing the at least one image with a second neural network model different from the first neural network model. As described herein, for each image classified as being an image of a particular type of space (e.g., yard, kitchen, bedroom, etc.), one or more neural network models may be applied to identify home features in that type of space that are indicative of the home's value (e.g., identify the quality of grass in the yard, identify whether the kitchen has stainless steel appliances, identify whether the living room has coffered ceilings, etc.). For each image obtained at act 202, any suitable number (e.g., two, three, five, between two and ten, etc.) of feature extraction machine learning models (e.g., neural network models) may be applied to extract such features from the image. For example, if three home features are to be extracted from an image of a kitchen, then three feature extraction machine learning models may be applied to the image of the kitchen to determine three feature values. Examples of home features that may be extracted using a feature extraction machine learning model are provided herein.

Figure 3B:
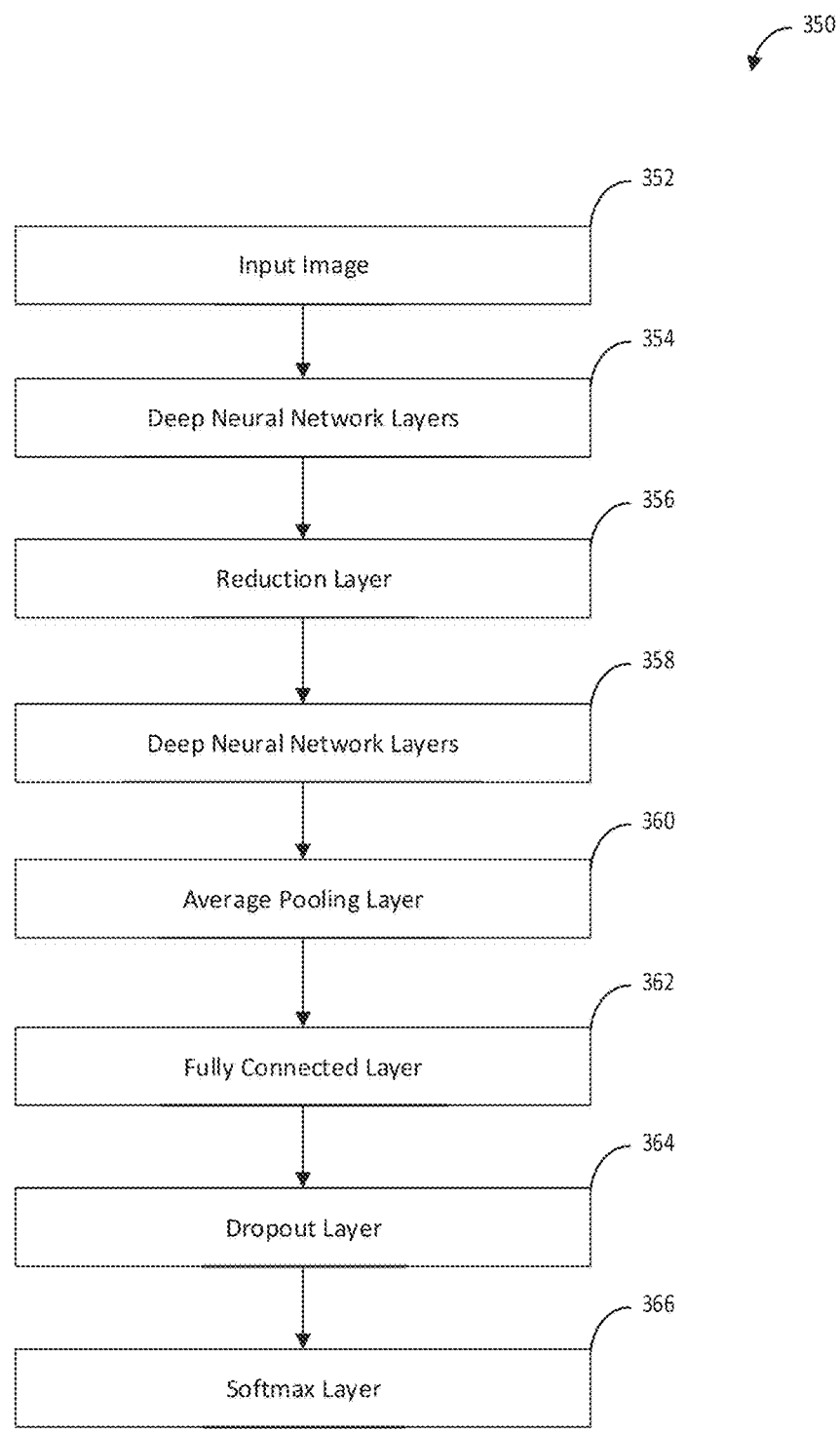
FIG. 3B is a diagram of an illustrative neural network model 350 configured to process an image of a space in a home to identify, in the image, one or more features indicative of the home's value, in accordance with some embodiments of the technology described herein.

In some embodiments, the second neural network model may be a deep neural network having one or more convolutional layers, one or more pooling layers, one or more fully connected layers and/or a softmax layer. An illustrative architecture of the first neural network is shown in FIG. 3B, described below. It should be appreciated that, in some embodiments, any suitable type of feature extraction machine learning model may be used at act 206, as aspects of the technology described herein are not limited to using neural network models for feature extraction. For example, any of the machine learning models described herein with reference to the feature extraction machine learning models 106 may be used. And even if a neural network model were used, in some embodiments with the architecture shown in FIG. 3B, in other embodiments a different neural network architecture may be employed.

Next, process 200 proceeds to act 208, where the value of the home is determined at least in part by using the one or more features identified at act 206. In some embodiments, the home features identified at act 206 may be provided as input to a machine learning model trained to determine the value of the home based on these features alone or in combination with one or more other features, such as other features 108 described herein with reference to FIG. 1. In some embodiments, the machine learning model is different from the 18 first and second neural network models utilized at acts 204 and 206. The machine learning model used at act 210 may be a random forest model, in some embodiments. However, in other embodiments, a neural network model or any other suitable type of machine learning model may be used at act 210, as aspects of the technology described herein are not limited in this respect.

FIG. 3A is a diagram of an illustrative neural network model 300 configured to process an image of a space of a home to determine the type of the space, in accordance with some embodiments of the technology described herein.

As shown in FIG. 3A, the illustrative neural network model 300 is an ensemble model comprising two neural network sub-models 310 and 320. The first neural network sub-model 310 includes one or more deep neural network layers 312, followed by an average pooling layer 314, followed by a fully connected layer 316 (sometimes termed a "dense" layer), followed by a softmax layer 318. The second neural network sub-model 320 includes one or more deep neural network layers 322, max-pooling layer 324, fully connected layer 326 and softmax layer 328. The results output by softmax layers 318 and 328 are combined using prediction combination logic 330.

Each of the softmax layers 318 and 328 is the same size as the number of output classes, each representing a different type of space classification that may be assigned to an image. The prediction combination logic 330 may combine the predictions by taking class averages and renormalizing, though in other embodiments the ensemble combination may be performed in any other suitable manner.

As can be seen from FIG. 3A, the architectural difference between the first and second neural network sub-models is that that the first one uses an average pooling layer and the second one uses a max pooling layer. Of course, even if the two sub-portions include the same type of layer in the architecture, like the fully connected layer, the weights associated with those layers may be different between the sub-models. However, these differences are not architectural. The inventors have found that using two sub-models, one with an average pooling layer and the other with a max pooling layer reduces the occurrence of classification errors. In addition, this allows for 99% image recall ("recall" is also known as sensitivity, true positive rate, or the detection rate) with a higher decision threshold than otherwise possible.

In the illustrated embodiment, an input image 302 would be provided as input to both deep neural network layers 312 and 322, the outputs of which would be processed by the average and max pooling layers 314 and 324 respectively. The outputs of the average and max pooling layers 314 and 324 would be processed by fully connected layers 316 and 326, respectively. The outputs of fully connected layers 316 and 326 would be processed by softmax layers 318 and 328, respectively. The outputs of the softmax layers 318 and 328 are combined by prediction combination logic 330 to obtain a space type classification for the input image 302.

In some embodiments, the architecture of the deep neural network layers 312 and 322 may be an architecture customized for the space classification problem. For example, in some embodiments, Google's Neural Architecture Search NASNet technique may be used to identify the neural network architecture as part of the training procedure from a set of building block layers (e.g., one or more convolution layers, one or more pooling layers, etc.). In NASNet, and a recurrent neural network controller samples these building blocks to create the resulting end-to-end architecture. Other automatic architecture identification tools (e.g., AutoML) may be used as well. The resulting neural network architecture may include multiple convolutional layers and multiple max and/or average pooling layers.

In some embodiments, the architecture of the deep neural network layers 312 and 322 may be the result of applying Google's NASNet technique to determine an architecture. For example, deep neural network layers 312 and 322 may include the architecture described in FIG. 2 of B. Zoph, V. Vasudevan, J. Shlens, and Q. V. Le, "Learning Transferable Architectures," *In Proceedings of the IEEE Conference on Computer Vision and Pattern Recognition* (CVPR), pages 8697-8706, 2019, which is herein incorporated by reference in its entirety.

FIG. 3B is a diagram of an illustrative neural network model 350 configured to process an image of a space in a home to identify, in the image, one or more features indicative of the home's value, in accordance with some embodiments of the technology described herein.

As shown in FIG. 3B, an input image 352 provided as input to the illustrative neural network 350 is first processed by deep neural network layer 354, followed by reduction layer 356 (to reduce the dimensionality of the tensor), followed by further deep neural network layers 358, followed by an average pooling layer 360, followed by a fully connected layer 362, followed by a drop-out layer 364, followed by a softmax layer 366. The output of the softmax layer indicates the value of the feature being identified by the neural network 350.

In some embodiments, the deep neural network layers 354 may include layers of an existing image processing neural network architecture. For example, deep neural network layers 354 may include one or more (e.g., all) layers of the ResNet model, ResNetV2 model, or the Inception-ResNetV2 model. For example, in some embodiments, deep neural network layers 354 may include layers of the architecture shown in FIGS. 6 and 7 of C. Szegedy, S. Ioffe, V. Vanhoucke, A. A. Alemi "Inception-v4, Inception-ResNet, and the Impact of Residual Connections on Learning" Proceedings of the Thirty-First AAAI Conference on Artificial Intelligence, pages 4278-4284, 2017, which is incorporated by reference in its entirety. Aspects of this architecture are also described in C. Szegedy, S. Ioffe, V. Vanhoucke, A. A. Alemi "Inception-v4, Inception-ResNet, and the Impact of Residual Connections on Learning", https://arxiv.org/abs/1602.07261, Aug. 23, 2016, which is incorporated by reference in its entirety. As another example, in some embodiments, deep neural network layers 354 may include layers of the architecture shown in M. Tan, Q. V. Le, "EfficientNet: Rethinking Model Scaling for Convolutional Neural Networks", https://arxiv.org/pdf/1905.11946.pdf Jun. 10, 2019, which is incorporated by reference in its entirety.

As such, the deep neural network layers 354 may include one or more convolutional layers, may include residual connections, and may use kernels with different resolutions for processing data from the same layer (e.g., use 3×3 kernels and 5×5 kernels for processing input data). In some embodiments, the weights of the deep neural network layers may be initialized by training these layers, separately, by using the ImageNet data set. Similarly, the deep neural network layers 356 may include layers of an existing image processing neural network architecture such as ResNet, ResNet V2, or the Inception-ResNetV2.

As described herein, different feature extraction neural networks may be trained for extracting different features from images of a home. In some embodiments, different feature extraction neural networks may have a common architecture (e.g., the architecture shown in FIG. 3B). In other embodiments, different feature extraction networks may have different architectures. But even if two different feature extraction neural networks have the same underlying architectures, the neural networks will have different parameter values because they are being trained with different sets of training data to identify different features.

Figure 3C:
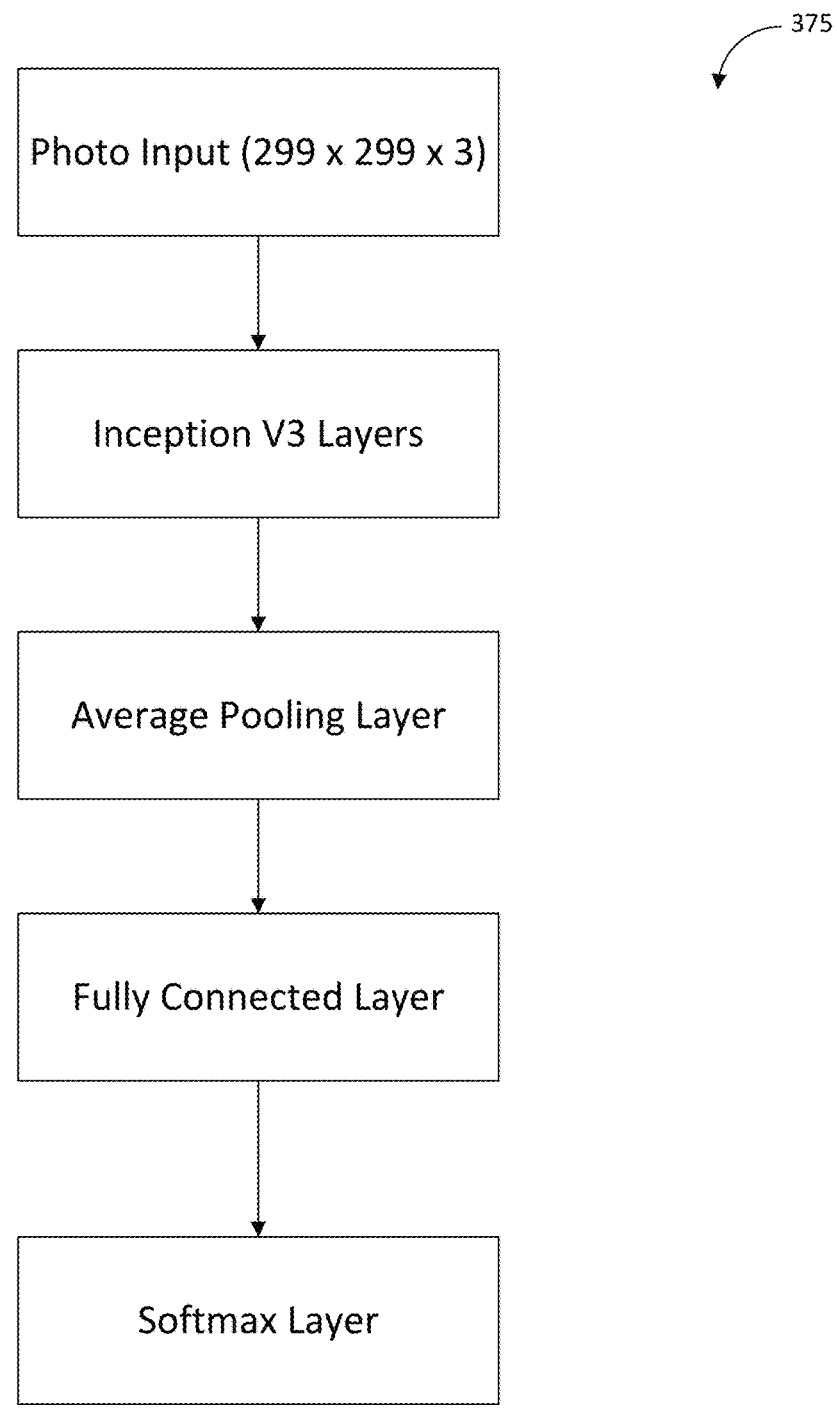
FIG. 3C is an illustrative diagram of a TensorFlow for Poets neural network model 375.

The combination of the data augmentation process described herein and the neural net architecture described herein provides substantial improvements in accuracy over conventional approaches to the same problem. In one example, where the prediction task is to predict the "finish" of kitchen ovens ("stainless steel", "white", "black") our model, architected in the manner described above with respect to FIG. 3B and trained on the data augmented by the process described herein, predicted the correct class 88% of the time on a previously unseen validation dataset. On that same problem, a conventional Inception V3 model created using the TensorFlow for Poets framework with only a single extra layer added and trained on the same augmented data was 75% accurate. FIG. 3C illustrates the architecture 375 for the TensorFlow for Poets model. That same TensorFlow for Poets model, when trained on un-augmented data which was otherwise labeled in the same manner, achieved only 61% accuracy on that same task. In this way, it can be seen that the data augmentation process developed by the inventors and the neural network architecture developed by the inventors, each contribute to the substantial performance improvement relative to conventional approaches on the same problem.

Additionally, the model that ultimately determines the price of the home (e.g., model 110 described with reference to FIG. 1), which takes the features extracted from images as inputs, among other data, also significantly outperforms known published baselines. Taking the model that is trained to predict home values in the Denver metro area, the process outlined above yields accuracy of 69.3% within 5%. This compares to the Redfin Estimate's reported accuracy of 59.2% within 5% for the same counties and property types in the Denver metro area, and to the Zillow Zestimate's 46.2% within 5% for the same counties.

Next we describe techniques for training the space classification and feature extraction machine learning models, such as the neural network models 300 and 350 described above with reference to FIGS. 3A and 3B. In particular, we describe below: (1) techniques for generating, labeling, and augmenting training data; (2) techniques for training the neural networks using the training data; (3) techniques for improving the quality of training data (and retraining the machine learning models based on the improved training data); and (4) computational aspects of training the machine learning models described herein and using the trained machine learning models to process images of a home.

In some embodiments, the training data used to train the machine learning models described herein is labeled. For example, a space classification ML model (e.g., model 104 or model 300) may be trained using images of spaces of a home labeled with the spaces that they depict. As another example, a feature extraction ML model for identifying the quality of grass in a yard may be trained using images of yards with labels indicating the quality of grass in those yards. The inventors have developed various techniques for obtaining and labeling images to use for training the machine learning models described herein.

Training Data Generation and Augmentation

In some embodiments, at least some of the images used for training a machine learning model may be manually labeled by one or more labelers (e.g., using Amazon's Mechanical Turk platform or any other suitable crowdsourcing platform). However, in order 24 to obtain high quality labels and reduce cost of performing the labeling a number of techniques may be employed, as described next.

In some embodiments, the workers may be tested or qualified based on their performance on a small test set of images whose labels may be known and verified to be correct. Labelers who pass the qualification test (e.g., by correctly labeling a specified threshold number of test set images, such as 90%) may be allowed to label other images. On the other hand, labelers who do not pass the qualification test are not allowed to proceed.

In some embodiments, examples and instructions may be refined based on worker performance so that workers can be more accurate in their classifications In some embodiments, feedback may be provided to individual workers to highlight differences, on specific examples, between their labels and labels assigned by others to help the workers improve the manner in which they perform labeling.

In some embodiments, workers may be presented with a preliminary label and asked to verify whether that preliminary label is correct or whether it should be changed to a different label. This approach may make the workers more efficient at their task relative to how long it would take (and how much it would cost) if the workers were asked to provide a label from scratch.

In some embodiments, the preliminary labels may be obtained by using automated or semi-automated image processing technique. For example, in some embodiments, convolutional neural networks may be applied to the images to identify whether certain types of objects are present (e.g., refrigerator, oven, microwave, toilet, etc.) and use predefined rules to label the images when the objects are found (e.g., if a toilet is found in the image using a convolutional neural network, then the image is labeled as "bathroom", if an oven is found in the image using a convolutional neural network, then the image is labeled as "kitchen", if grass is found in the image using a convolutional neural network, then the image may be labeled as "yard", etc.).

In some embodiments, labels may be assigned automatically by an initial version of a space classification ML model. The initial version of the space classification ML model may be used to label images for subsequent verification by manual labelers and, in turn, for further training the initial version of the space classification model. In such embodiments, the initial version of the space classification ML model may be used with rules to assign labels. Illustrative examples of rules include, but are not limited to: (1) if a bed is 24 found and the probability of a bedroom is at least 30%, then label the image as "bedroom"; (2) if couch and kitchen appliances are found and the probability of "living area" is at least 30%, then label the image as "living area" photo; (3) if a couch and TV is found but no kitchen appliances are found, and the probability of the main living area is >30%, then label the image is "living area" photo; and (4) if a couch and kitchen appliances are found, and the probability of "kitchen and living area" is >30%, then label the image as a "kitchen and living area" photo.

In some embodiments, in order to ensure that there is a sufficient number of images, the training data images may be augmented by generating new images through transformations of existing images in the training data set. For example, in some embodiments, an image may be rotated, left shifted and cropped, right shifted and cropped, zoomed and cropped, flipped horizontally, or blurred to generate new images for inclusion in the training data set (only one of the images would need to be labeled, as the label would then apply to all derived or related images). As another example, the brightness of an image may be changed, contrast of the image may be changed, or random noise may be added to the image to generate new images for the training data set. Some of these transformation may be 6 used alone or in combination with other transformations including the ones described above and/or any other suitable transformations.

Training Procedures

In some embodiments, the parameters of the neural network models described herein may be learned from training data using any suitable neural network training technique. Any suitable optimization technique may be used for estimating neural network parameters from training data. For example, one or more of the following optimization techniques may be used: stochastic gradient descent (SGD), mini-batch gradient descent, momentum SGD, Nesterov accelerated gradient, Adagrad, Adadelta, RMSprop, Adaptive Moment Estimation (Adam), AdaMax, Nesterov-accelerated Adaptive Moment Estimation (Nadam), and AMSGrad.

In some embodiments, transfer learning techniques may be used to train the machine learning models described herein. In some embodiments, the parameter values of one or more neural network layers may be initialized to parameter values previously obtained for such neural network layers using a publicly available image data set. For example, in some embodiments, the parameter values of deep neural network layers 312 and 322 of neural network model 300 may be initialized with NASNet weights based on training the NASNet model on the ImageNet dataset. As another example, in some embodiments, the parameter values of deep neural network layers 354 and 358 may be initialized with Inception-ResNet V2 weights based on training the Inception-ResNet V2 model on the ImageNet data set. Then, these and/or any other weights, may be updated during the training. However, not all such layers are updated, in some embodiments. For example, a number of initial deep neural network layers may be fixed (so that the parameter values are locked and not trainable), and the optimization technique may train/update the parameter values of subsequent layers but not the fixed layers.

As described above, in some embodiments, a trained machine learning model may be used to improve the quality of training data used to train it. In some embodiments, the trained machine learning model (e.g., model 104, 106-1, . . . , 106-N, 300, or 350) may be applied to data used to train it, and the output of the ML model may be compared to the label provided. When a difference is detected between ML model output for an input image and the label assigned to the input image, the label may be changed either automatically or manually.

In some embodiments, the following technique may be used to update labels of images the training data. Identify a set of images, for each class (label), on which the ML prediction differs from the label. When the ML prediction is associated with a high confidence (e.g., >80%) and is correct and the label is wrong for at least a threshold percentage of the set of images, label all the images in the set with the correct label. When the ML prediction is associated with a moderate confidence (e.g., 60-80%), perform manual inspect and relabel the images.

In some embodiments, the following algorithm may be employed:

For each class in the data:
    For each probability in 80%, 90%, 95%, 98%:
        Inspect a threshold number of images (e.g., 30 images) predicted near the probability where the label is not equal to the prediction
        If the ML model is right on at least a threshold percentage (e.g., 28/30) of them (data label is wrong) then
            Relabel all data to the predicted class where softmax output>above probability
            Move to the next class
        If not, then move on to higher probability
    Where the ML model is moderately confident (prediction probability between 60% and probability selected above)
        Manually inspect 300 photos to ascertain which of the following cases was true:
            Worker was clearly wrong, model was clearly right. In this case we label the data and mark the task as failed
            Worker was clearly right, model was clearly wrong: In this case we increase the weight of this training example so that the model is incentivized to learn it better
            Case is ambiguous. In this case we note what the ambiguity was and consider the creation of a new classification (e.g. many photos are of kitchen AND living room, and both model and workers struggle to pick one. We create a new class, "Kitchen & Living Room" to make the class unambiguous)
Predict on new images not in the training or validation data to find 10-20K images where the predictions are uncertain, such that no class has a probability of over 80%, and then send these photos to Mechanical Turk to be classified. Afterwards, download this data and include it in the training data.
Retrain model (which should then be more accurate) and repeat this process until we are satisfied with model performance.

Regardless of the manner in which the training data are updated, the machine learning model may be updated by being retrained on the updating training data. This process may be repeated multiple times until a stopping condition is met (e.g., the change in classification performance on a test set of images does not change by more than a specified threshold amount).

Computational Complexity

It should be appreciated that the machine learning models described herein may include tens of thousands, hundreds of thousands, or millions of parameters. For example, the neural network models 300 and 350 may include millions of parameters. As a specific example, in some embodiments, the neural network model 300 may include 90 million parameters. As another specific example, the neural network model 350 when trained to recognize the type of countertop in high-resolution kitchen images includes about 150 million parameters. As such, applying such neural network models to images (even after they are trained) requires millions and millions of calculations to be performed, which cannot be done practically in the human mind and without computers. The algorithms for training such neural network models require even a greater amount of computational resources, as such models are trained using tens or hundreds of thousands of images. Neither the training algorithms nor the use of the trained models may be performed without computing resources.

Applications to Buying and Selling Property

The inventors have appreciated that customers don't need to miss out on their dream home just because they have not yet sold their current home. The techniques described herein may be used to allow the customer to become a cash buyer, and to be able to sell their home for a top price while having the price and timing certainty of a backstop offer.

Thus, using the techniques outlined below, a customer need not miss out on their next home because they haven't sold their current home. Instead a customer could make an all-cash offer on their next home by having a Broker (e.g., Perch) buy their new home with our cash. Once moved in, the Broker lists the customer's old home for sale to get the best price. If the home doesn't sell in 90 days (note: we will explore offering up to 120 days), the customer can accept a pre-agreed upon cash offer from the Broker. Once their old home sells, the customer takes out their mortgage and purchases the home from the Broker.

| STAGE | CUSTOMER ACTION | BROKER ACTION | BROKER team actions at each stage |
|---|---|---|---|
| GET STARTED | Fills out intake form on Broker website | Checks if current home is eligible for a guaranteed sale price | INVESTMENTS - underwrites old home per usual and sends estimate |
| GET STARTED | | Customer experience representative calls and qualifies lead. Schedules Agent (or other local market expert) appointment | Customer experience representative - contacts customer to schedule Agent appointment and Market Manager/Inspector walkthrough |
| GET STARTED | Meets with Agent to discuss Broker's buy/sell offering | In addition to Agent, Broker sends Inspector and Market Manager to walk home | Agent, Market Manager, Inspector - go to customer's home. |
| GET STARTED | Fills out mortgage pre-approval | If they are open to starting their mortgage pre-approval with Broker, Broker does a soft credit pull and does an initial underwrite to see if customer will qualify for a Broker mortgage. | Agent - advises client to get pre-approved for mortgage. Presents Broker Mortgage as one solution they can choose to use. MORTGAGE - receives application and uses Guaranteed Sales Price of old home to underwrite customer. Then reports back to customer how much they are approved for |
| GET STARTED | Agent presents a) how much home they can afford (from mortgage preapproval) b) recommended listing price c) cash offer backstop d) estimated costs of HOA/tax/utilities they'll pay on new home for ~2-3 months on new home (based on their home budget). This amount comes out at closing of their old home | Broker shares how much Broker will pre-approve them for to purchase Broker's Agent provides recommended listing strategy and cash offer amount. This may be done using any of the machine learning techniques described herein including, for example, using the process 200 described with reference to FIG. 2. | Agent - to use a simple calculator we create to estimate the cost of HOA/tax/utilities on the new home so the customer knows what they'd be responsible for. |
| GET STARTED | Customer signs: Buyers rep agreement Listing rep agreement Purchase agreement for backstop offer Custom agreement that outlines parameters of us buying their new home and agreeing to sell it to them at same price | | Agent and OPS - to ensure all required documents are presented and signed |
| BUY | Starts touring homes with Broker showing agent | | |

| STAGE | CUSTOMER ACTION | BROKER ACTION | BROKER team actions at each stage |
|---|---|---|---|
| BUY | Finds a home they love and wants to submit an offer. They discuss a price they're willing to pay with their Agent Sign a document agreeing that they will buy the house from us later (PD confirming w/ legal) | Broker writes the purchase agreement to purchase the home at the agreed upon price. The PA is in Broker's name as the buyer and Broker Realty is buyer's agent<br>Customer puts a 1% earnest money deposit down (paid to Broker) once they find the new home<br>Broker presents a preliminary HOA/tax/utilities amount to the customer that they will be charged for the new home. These amounts will get deducted at closing of old home when it sells. | |
| BUY | | Broker's inspector walks the home and any concessions are negotiated in conjunction with the customer. Note: we will advise customer if home has foundation issue or is in flood plain, etc. We will monitor how many homes customers want to buy that we wouldn't, but we don't plan to block any homes from the program to start.<br>Broker presents final "rent" (tax/utilities/HOA fees on new home) amount and presents lease to customer to sign before option ends | |
| BUY | Customer signs lease to "rent" new home from Broker | | |
| BUY | | Option Period ends<br>Broker closes on the new home<br>Pre-listing activities (sign in yard, start marketing 'old home' as Coming Soon) | |
| BUY | Customer moves into the new home | Broker will begin to calculate accrued rent on the home, which is then deducted from the ultimate closing of the customer's old home (remember customer is still paying mortgage on their old home) | |
| SELL | | Broker lists customer's old home for sale once customer has moved into the new home (Customer must move into new home and out of old home within X days.)<br>Listing period is to be 90 days. If it hasn't gone under contract within 90 days it is sold to Broker for the cash offer | |
| SELL | | Broker Realty receives an offer for the home and presents it to the customer | |
| SELL | Customer accepts offer from 3rd party on their old house | Note: we will make sure we have contract mechanics such that customer can sell their home to 3rd party even though we also have a PA out to purchase their house | |
| SELL | Customer closes on sale of the old house to 3rd party buyer | | |
| SELL | | Broker deducts the pre-agreed upon accrued rent from proceeds on the sale of old home | |
| FINISHING | Customer takes out their mortgage to purchase their new home from Broker at the same net price as Broker bought it for. | If Broker Mortgage is chosen by customer, we broker the mortgage. | |
| FINISHING | Closes on purchase of new home from Broker | | |

FIG. 6 is a diagram of an illustrative computer system on which embodiments described herein may be implemented. An illustrative implementation of a computer system 600 that may be used in connection with any of the embodiments of the disclosure provided herein is shown in FIG. 6. For example, the process described with reference to FIG. 6 may be implemented on and/or using computer system 600. As another example, the computer system 600 may be used to train and/or use any of the machine learning models described herein. The computer system 600 may include one or more processors 610 and one or more articles of manufacture that comprise non-transitory computer-readable storage media (e.g., memory 630 and one or more non-volatile storage media 620). The processor 610 may control writing data to and reading data from the memory 630 and the non-volatile storage device 620 in any suitable manner, as the aspects of the disclosure provided herein are not limited in this respect. To perform any of the functionality described herein, the processor 610 may execute one or more processor-executable instructions stored in one or more non-transitory computer-readable storage media (e.g., the memory 630), which may serve as non-transitory computer-readable storage media storing processor-executable instructions for execution by the processor 610.

Having thus described several aspects and embodiments of the technology set forth in the disclosure, it is to be appreciated that various alterations, modifications, and improvements will readily occur to those skilled in the art. Such alterations, modifications, and improvements are intended to be within the spirit and scope of the technology described herein. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

The above-described embodiments can be implemented in any of numerous ways. One or more aspects and embodiments of the present disclosure involving the performance of processes or methods may utilize program instructions executable by a device (e.g., a computer, a processor, or other device) to perform, or control performance of, the processes or methods. In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement one or more of the various embodiments described above. The computer readable medium or media can be transportable, such that the program or programs stored thereon can be loaded onto one or more different computers or other processors to implement various ones of the aspects described above. In some embodiments, computer readable media may be non-transitory media.

The terms "program" or "software" are used herein in a generic sense to refer to any type of computer code or set of computer-executable instructions that can be employed to program a computer or other processor to implement various aspects as described above. Additionally, it should be appreciated that according to one aspect, one or more computer programs that when executed perform methods of the present disclosure need not reside on a single computer or processor, but may be distributed in a modular fashion among a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer, as non-limiting examples. Additionally, a computer may be embedded in a device not generally regarded as a computer but with suitable processing capabilities, including a Personal Digital Assistant (PDA), a smartphone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible formats.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The terms "approximately" and "about" may be used to mean within ±20% of a target value in some embodiments, within ±10% of a target value in some embodiments, within ±5% of a target value in some embodiments, within ±2% of a target value in some embodiments. The terms "approximately" and "about" may include the target value.

What is claimed is:

1. A system, comprising:
   at least one computer hardware processor; and
   at least one non-transitory computer-readable storage medium storing processor executable instructions that, when executed by the at least one computer hardware processor, cause the at least one computer hardware processor to perform:
   obtaining a plurality of images, the plurality of images including a first image of a first room inside a home and a second image of a second room inside the home;
   determining a type of the first room by processing the first image of the first room with a first neural network model, the first neural network model having a first plurality of layers comprising at least a convolutional layer, a pooling layer, a fully connected layer, or a softmax layer, the first plurality of layers including at least one million parameters, wherein the first image of the first room has a first resolution and wherein processing the first image of the first room with the first neural network model comprises:
      generating, from the first image, a second image of the first room having a second resolution lower than the first resolution; and
      processing the second image of the first room with the first neural network model;
   determining a type of the second room by processing the second image of the second room with the first neural network model;
   identifying at least one first feature in the first image of the first room by processing the first image with a second neural network model different from the first neural network model and trained using a first plurality of training images of rooms of a same type as the first room, the first plurality of training images including training images augmented by one or more transformations, the second neural network model having a second plurality of layers comprising at least first deep neural network layers, a reduction layer, second deep neural network layers, an average pooling layer, a fully connected layer, a dropout layer, or a softmax layer, the second plurality of layers including at least one million parameters;
   identifying at least one second feature in the second image of the second room by processing the second image of the second room with a third neural network model different from the first neural network model and second neural network model, the third neural network model trained using a second plurality of training images of rooms of a same type as the second room, the second plurality of training images including training images augmented by one or more transformations, the third neural network model having a third plurality of layers comprising at least first deep neural network layers, a reduction layer, second deep neural network layers, an average pooling layer, a fully connected layer, a dropout layer, or a softmax layer, the third plurality of layers including at least one million parameters; and
   determining a value of the home at least in part by using the at least one first feature and the at least one second feature as input to a machine learning model different from the first neural network model, the second neural network model, and the third neural network model.

2. The system of claim 1, wherein the first neural network model comprises two neural network sub-models including a first sub-model having an average pooling layer and a second sub-model having a max pooling layer instead of the average pooling layer.

3. The system of claim 2, wherein processing the first image of the first room with the first neural network model comprises:
   processing the first image using the first sub-model to obtain first results;
   processing the first image using the second sub-model to obtain second results; and combining the first and second results to obtain an output result for the first neural network model.

4. The system of claim 1, wherein the type of the first room is selected from the group consisting of: garage, living room, bedroom, kitchen, bathroom, dining room, family room, basement, attic, closet, laundry room, and mud room.

5. The system of claim 1, wherein the processor-executable instructions further cause the at least one computer hardware processor to perform:
processing multiple images using the first neural network model to identify images for which the first neural network model output differs from labels produced by manual classification;
obtaining new labels for at least some of the multiple images; and
updating one or more parameters of the first neural network model by using the at least some of the multiple images with the new labels.

6. The system of claim 1, wherein the second neural network model uses a bank of convolution kernels having different resolutions.

7. The system of claim 1, wherein the first room is a kitchen, and wherein identifying the at least one first feature comprises identifying a type of material of a countertop in the kitchen and/or identifying a finish of an appliance in the kitchen.

8. The system of claim 1, wherein the machine learning model is a random forest model.

9. The system of claim 1, wherein the second plurality of layers comprises first deep neural network layers, a reduction layer, second deep neural network layers, an average pooling layer, a fully connected layer, a dropout layer, and a softmax layer.

10. The system of claim 9, wherein processing the first image of the first room with the second neural network model comprises:
processing the first image with the first deep neural network layers to obtain first results;
providing the first results as input to the reduction layer to obtain second results;
providing the second results as input to the second deep neural network layers to obtain third results;
providing the third results as input to the average pooling layer to obtain fourth results;
providing the fourth results as input to the fully connected layer to obtain fifth results;
providing the fifth results as input to the dropout layer to obtain sixth results; and
providing the sixth results as input to the softmax layer to obtain an output result for the second neural network model.

11. A system, comprising:
at least one computer hardware processor; and
at least one non-transitory computer-readable storage medium storing processor executable instructions that, when executed by the at least one computer hardware processor, cause the at least one computer hardware processor to perform:
obtaining a plurality of images, the plurality of images including a first image of a first room inside a home, the first image having a first resolution;
determining a type of the first room by:
generating, from the first image, a second image of the first room having a second resolution lower than the first resolution; and
processing the second image of the first room with a first neural network model comprising:
a first neural network sub-model comprising a first plurality of layers comprising at least one million parameters, the first plurality of layers comprising at least deep neural network layers, an average pooling layer, a fully connected layer, or a softmax layer; and
a second neural network sub-model comprising a second plurality of layers comprising at least one million parameters, the second plurality of layers comprising at least deep neural network layers, a max pooling layer, a fully connected layer, or a softmax layer;
identifying at least one first feature in the first image of the first room by processing the first image with a second neural network model different from the first neural network model and trained using images of rooms of a same type as the first room, the second neural network model further having a third plurality of layers comprising at least a convolutional layer, a pooling layer, a fully connected layer, or a softmax layer, the third plurality of layers including at least one million parameters; and
determining a value of the home at least in part by using the at least one first feature as input to a machine learning model different from the first neural network model and the second neural network model.

12. The system of claim 11, wherein:
the first plurality of layers of the first neural network sub-model comprises deep neural network layers, an average pooling layer, a fully connected layer, and a softmax layer; and
the second plurality of layers of the second neural network sub-model comprises deep neural network layers, a max pooling layer, a fully connected layer, and a softmax layer.

13. The system of claim 12, wherein processing the second image of the first room with the first neural network model comprises:
processing the second image using the first neural network sub-model to obtain first output results;
processing the second image using the second neural network sub-model to obtain second output results; and
combining the first output results and second output results to obtain an output result for the first neural network model.

14. The system of claim 13, wherein processing the second image using the first neural network sub-model comprises:
processing the second image with the deep neural network layers to obtain first results;
providing the first results as input to the average pooling layer to obtain second results;
providing the second results as input to the fully connected layer to obtain third results; and
providing the third results as input to the softmax layer to obtain the first output results.

15. The system of claim 11, wherein the first resolution is 600×600 pixels and the second resolution is 300×300 pixels.

16. The system of claim 11, wherein:
the second neural network model was trained using a plurality of training images of rooms of a same type as the first room, the plurality of training images including training images augmented by one or more transformations.

17. The system of claim 11, wherein the second plurality of layers of the second neural network model comprises:
first deep neural network layers, a reduction layer, second deep neural network layers, an average pooling layer, a fully connected layer, a dropout layer, and a softmax layer.

18. The system of claim 11, wherein the first plurality of training images and the second plurality of training images each comprise at least 10,000 training images.

19. A method, comprising:
using at least one computer hardware processor to perform:
obtaining a plurality of images, the plurality of images including a first image of a first room inside a home and a second image of a second room inside the home;
generating, from the first image of the first room, a second image of the first room having a lower resolution than the first image of the first room;
determining a type of the first room by processing the second image of the first room having a lower resolution than the first image of the first room with a first neural network model, the first neural network model having a first plurality of layers comprising at least a convolutional layer, a pooling layer, a fully connected layer, or a softmax layer, the first plurality of layers including at least one million parameters;
determining a type of the second room by processing the second image of the second room with the first neural network model;
identifying at least one first feature in the first image of the first room having a higher resolution than the second image of the first room by processing the first image of the first room with a second neural network model different from the first neural network model and trained using a first plurality of training images of rooms of a same type as the first room, the first plurality of training images including training images augmented by one or more transformations, the second neural network model having a second plurality of layers comprising at least first deep neural network layers, a reduction layer, second deep neural network layers, an average pooling layer, a fully connected layer, a dropout layer, or a softmax layer, the second plurality of layers including at least one million parameters;
identifying at least one second feature in the second image of the second room by processing the second image with a third neural network model different from the first neural network model and second neural network model, the third neural network model trained using a second plurality of training images of rooms of a same type as the second room, the second plurality of training images including training images augmented by one or more transformations, the third neural network model having a third plurality of layers comprising at least first deep neural network layers, a reduction layer, second deep neural network layers, an average pooling layer, a fully connected layer, a dropout layer, or a softmax layer, the third plurality of layers including at least one million parameters; and
determining a value of the home at least in part by using the at least one first feature and the at least one second feature as input to a machine learning model different from the first neural network model, the second neural network model, and the third second neural network model.

20. The method of claim 19, wherein the first neural network model comprises two neural network sub-models including a first sub-model having an average pooling layer and a second sub-model having a max pooling layer instead of the average pooling layer.

21. The system of claim 20, wherein processing the second image of the first room having a lower resolution than the first image of the first room with the first neural network model comprises:
processing the second image of the first room having the lower resolution than the first image of the first room using the first sub-model to obtain first results;
processing the second image of the first room having the lower resolution than the first image of the first room using the second sub-model to obtain second results; and
combining the first and second results to obtain an output result for the first neural network model.

22. The method of claim 19, wherein the second plurality of layers comprises first deep neural network layers, a reduction layer, second deep neural network layers, an average pooling layer, a fully connected layer, a dropout layer, and a softmax layer.

\* \* \* \* \*